US010009390B1

(12) United States Patent
Laurent (10) Patent No.: US 10,009,390 B1
(45) Date of Patent: Jun. 26, 2018

(54) SYSTEM AND METHOD FOR LOCATION-BASED SHARING OF INFORMATION AND LOCATION-BASED RESPONSE TO THE SHARED INFORMATION

(71) Applicant: Hashington GCV, Wilrijk (BE)

(72) Inventor: Christophe Laurent, Wilrijk (BE)

(73) Assignee: Hashington GCV, Wilrijk (BE)

( * ) Notice: Subject to any disclaimer, the term of this patent is extended or adjusted under 35 U.S.C. 154(b) by 0 days. days.

(21) Appl. No.: 15/384,992

(22) Filed: Dec. 20, 2016

(51) Int. Cl.
*H04L 29/06* (2006.01)
*H04L 12/58* (2006.01)
*H04W 64/00* (2009.01)

(52) U.S. Cl.
CPC ........ *H04L 65/4007* (2013.01); *H04L 51/046* (2013.01); *H04W 64/00* (2013.01)

(58) Field of Classification Search
CPC ....... H04W 64/00; H04W 4/021; H04W 4/22; G01C 21/20; G01S 5/0221; G01S 5/02; H04L 65/4007; H04L 51/046
See application file for complete search history.

(56) References Cited

U.S. PATENT DOCUMENTS

| 8,826,139 | B1 | 9/2014 | Wendkos et al. |
| 8,990,325 | B2 | 3/2015 | Eaton et al. |
| 2002/0023018 | A1 | 2/2002 | Kleinbaum |
| 2004/0008125 | A1 | 1/2004 | Aratow et al. |
| 2007/0161383 | A1* | 7/2007 | Caci ........................ G01C 21/20 455/457 |
| 2007/0245002 | A1 | 10/2007 | Nguyen et al. |
| 2013/0166386 | A1 | 6/2013 | Simmons |
| 2015/0111524 | A1* | 4/2015 | South ..................... H04W 4/021 455/404.2 |

OTHER PUBLICATIONS

Garun, "Facebook's New Community Help Tool Lets Users Offer and Find Help During Emergency Crises", The Verge, http://www.theverge.com/2016/11/17/13664656/facebook-community-help-emergency-tool,Nov. 17, 2016 (2 pages).

(Continued)

*Primary Examiner* — Nizar Sivji
(74) *Attorney, Agent, or Firm* — Crowell & Moring LLP (57) ABSTRACT

The disclosure is directed to a system and method for sharing, broadcasting, or publishing information by a user from a location in real-time and allowing one or more users near that location to directly respond to and directly communicate with the sharing, broadcasting, or publishing user. A computing device, for example, may receive a request for assistance from a first user computing device and determine a geographical location corresponding to the first user computing device. The computing device may publish the geographical location. The computing device may also receive a response to the request for assistance from a second user computing device and may determine whether the response indicates a request to establish communication with the first user computing device. Based on the determination, the computing device may establish direction communication between the first user computing device and the second user computing device.

19 Claims, 5 Drawing Sheets

(56) References Cited

OTHER PUBLICATIONS

Petronzio, "Facebook Creates Community Help Tool so Users Can Aid Each Other After Disasters", Mashable, http://mashable.com/2016/11/17/facebook-community-help/#2d_wStZp2Eqb, Nov. 17, 2016 (4 pages).

Winters, "How Facebook is Transforming Disaster Response", Wired, https://www.wired.com/2016/11/facebook-disaster-response/, Nov. 10, 2016 (8 pages).

Davis, "Incredible Videos, Images Emerge from Manchester's Epic Storm", Mashable, http://mashable.com/2016/09/14/epic-manchester-storm/?utm_cid=a-infi-r-1#u.Rg4mJ32mqq, Sep. 14, 2016 (10 pages).

Ryall, "Social Media Documents New Jersey Train Crashing into Station During Rush Hour", Mashable, http://mashable.com/2016/09/29/hoboken-train-crash-social-media/?utm_cid=hp-h-5#iNpsfEb_miqw, Sep. 29, 2016 (6 pages).

Mahr, "Uber Tries Out 'Panic Buttons' After Rape Cases in South Africa", The Age, http://www.theage.com.au/technology/technology-news/uber-tries-out-panic-buttons-after-rape-cases-in-south-africa-20160929-grrsix.html?eid=email:nnn-13omn624-ret_newsl-membereng:nnn-04%2F11%2F2013-technology-dom-technology-nnn-age-u&campaign_code=13ITE006 &promote_channel=edmail& mbnr=MzY0NTUzOQ, Sep. 29, 2016 (2 pages).

Barrett, "Emergency Alert Texts are Getting a Much Needed Upgrade", Wired, https://www.wired.com/2016/09/emergency-alert-texts-getting-much-needed-upgrade/, Sep. 29, 2016 (4 pages).

"Crisis Mapping", Wikipedia, https://en.wikipedia.org/wiki/Crisis_mapping, retrieved Dec. 20, 2016 (3 pages).

Ushahidi, https://www.ushahidi.com/, retrieved Dec. 20, 2016 (1 page).

Sahana Foundation, Open Source Disaster Management Software, https://sahanafoundation.org/, retrieved Dec. 20, 2016 (6 pages).

PulsePoint, http://www.pulsepoint.org/, retrieved Dec. 20, 2016 (9 pages).

* cited by examiner

FIG. 10
1000 ff# SYSTEM AND METHOD FOR LOCATION-BASED SHARING OF INFORMATION AND LOCATION-BASED RESPONSE TO THE SHARED INFORMATION

BACKGROUND ART

The invention relates to a system and method for sharing, broadcasting, and/or publishing information by a user from a location in real-time and allowing one or more users near that location to directly respond to and directly communicate with the sharing, broadcasting, and/or publishing user.

Crisis mapping is the real-time gathering, display, and analysis of data during a crisis, such as a natural disaster and social or political conflict, e.g., violence, protests, etc. Projects involving crisis mapping allow a large number of people, including crisis responders and the general public, to contribute information either remotely or from the site of the crisis. In that regard, crisis mapping encourages the public to engage and report information related to the crises, which can improve data management. Crisis mappers may work with data derived from various sources and can be analyzed for different purposes. Tools for crisis mapping include mobile and web-based applications, participatory maps and crowdsourced event data, aerial and satellite imagery, geospatial platforms, advanced visualizations, live simulations, and computational and statistical models.

"Ushahidi," for example, is open-source software that gathers data from crowdsourcing tools, such as SMS, e-mail, and social media platforms, and allows users to manage, survey, and respond to a situation. Another example is the "Sahana Free and Open Source Disaster Management System," which is an emergency management and disaster preparedness software that aims to provide web-based disaster management applications, such as an online bulletin board of missing and found people, a tracking tool to capture information about the places where each organization is active and the ranges of services being provided, a shelter registry to keep track of location and basic data of shelters in the region, inventory management, and a situation awareness tool to allow people to add information and collaboratively capture the current disaster situation. Moreover, "PulsePoint" is a mobile phone application that uses the current location of a user and alerts the user if someone nearby is suffering from a heart attack and is in need of cardiopulmonary resuscitation.

The above-described crisis mapping tools, however, are limited and disadvantageous in numerous ways. First, the primary source of information originates from the people that merely witness the crisis or incident (typically via social media platforms) and not from the people who are directly affected by the crisis or incident. It is also difficult to organize the numerous amounts of data and information received from the social media platforms, determine where the victims are located, and determine how to specifically help those victims. Second, the benefit of crisis mapping tools is limited by the people subscribed to the crisis mapping services and/or the limited number of people certified and approved by the services to render assistance. Similarly, requesting assistance through social media platforms is not only limited to the user's network of friends and its size, but helpful only if those friends are near the location of the user. Third, users are required to download applications or sign-up for the crisis mapping services before use, which is a severe limitation for users who have not downloaded the applications or have signed up when a crisis or incident actually occurs. Moreover, crisis mapping tools are typically used only for urgent situations.

SUMMARY OF THE INVENTION

In accordance with one or more aspects of the disclosure, the invention is directed to a system and method for sharing, broadcasting, and/or publishing information by a user from a location in real-time and allowing one or more users near that location to directly respond to and directly communicate with the sharing, broadcasting, and/or publishing user via a platform. The information may include a request for assistance. The request for assistance may be an emergency prompted by a particular incident, such as vehicular accident, or may be non-urgent, such as a request for pizza delivery.

The use of the platform may be as ubiquitous as calling 911, 112, or shouting for help. The platform is more expansive than a predefined network of friends, and thus, the sharing, broadcasting, and/or publishing user may be able to share, broadcast, and/or publish information to any user of the platform, such as to people that the sharing, broadcasting, and/or publishing user may not know or not have connected with on social media. In at least that regard, the platform may empower a community of users to help and provide assistance to each other. Moreover, the platform may allow bystanders and/or witnesses to assist users in need by posting relevant information to the platform for other users to see.

Unlike the crisis mapping tools described above, the platform of the present disclosure allows the information to originate directly from a victim needing assistance and also allows a responder to directly communicate with the victim without the victim and the responder having to have a predefined relationship.

DETAILED DESCRIPTION OF EMBODIMENTS OF THE INVENTION

The invention relates to a system and method for sharing, broadcasting, and/or publishing information by a user from a location in real-time and allowing one or more users in near that location to directly respond to and directly communicate with the sharing, broadcasting, and/or publishing user. The information may be a request for assistance related to an emergency or a non-urgent matter.

In one example, a driver may have inadvertently crashed his or her vehicle into a stationary object, such as a tree. Although the driver is conscious, the driver is trapped in the vehicle and has suffered numerous injuries. Moreover, the driver may not know the exact geographical location of the accident, nor does the driver know nearby cross streets due to the driver's unfamiliarity with the area.

To request help, the driver may use his or her mobile device to connect to a platform (hereinafter referred to as the "HLPR" platform) by opening a web browser (for retrieving, presenting, and/or traversing information resources on the World Wide Web) and typing a URL (such as "HLPR-.global," "HLPR.be," "HLPR.network," or "HLP.rs"), or alternatively, opening a corresponding mobile application, in order share, broadcast and/or publish on the HLPR platform information about the accident. The information may include, among other things, the severity of the accident, the time at which the accident occurred, the status of the driver, the various injuries sustained by the user, and images and/or videos of the injuries and the accident. The HLPR platform may then publish or broadcast the information on a HLPR map interface, and make known to the other users of the platform at least the exact geographical location of the driver and the time that the accident occurred.

Subsequently, one or more users of the HLPR platform near the location of the driver may respond to the driver's request for emergency assistance and establish direct communication with the driver to ascertain more information about the accident and injuries, if necessary, in order to render the requisite assistance. In at least that regard, the information about the accident and the status of the driver is directly provided by the driver to the responder-user, and not from social media platforms. Moreover, the HLPR platform is readily available to the driver via the web browser in the event the driver did not have the HLPR platform downloaded onto the mobile device beforehand.

In another example, a driver may puncture a tire while driving his or her vehicle and may require assistance in changing the deflated tire. In yet a further example, a person who may request one or more nearby users to order and pick-up carryout, such as pizza. In these examples, the requests are not urgent, which the user can specify on the HLPR platform. The HLPR map interface can graphically represent the various requests in different ways depending on the urgency of those requests. For instance, an emergency can displayed in a certain color, or in larger font, so that users are able to quickly decipher the emergency from non-urgent requests.

In other instances, the users of the HLPR platform—as bystanders or witnesses of the various incidents—may post information, e.g., descriptions, photographs, videos, etc., of the incidents. The HLPR platform may automatically associate the posted information to the respective incidents so that other users who are willing to respond may have access to information, which may not have been otherwise provided by those directly affected by the incidents. The posted information may be monitored and regulated by the community of users so that objectionable, or even irrelevant, information are removed from the HLPR platform. In other embodiments, the images, videos, or other suitable types of information may be pixilated or redacted if they are relevant. Relevancy, for example, may be determined by votes from the community of users.

Figure 1:
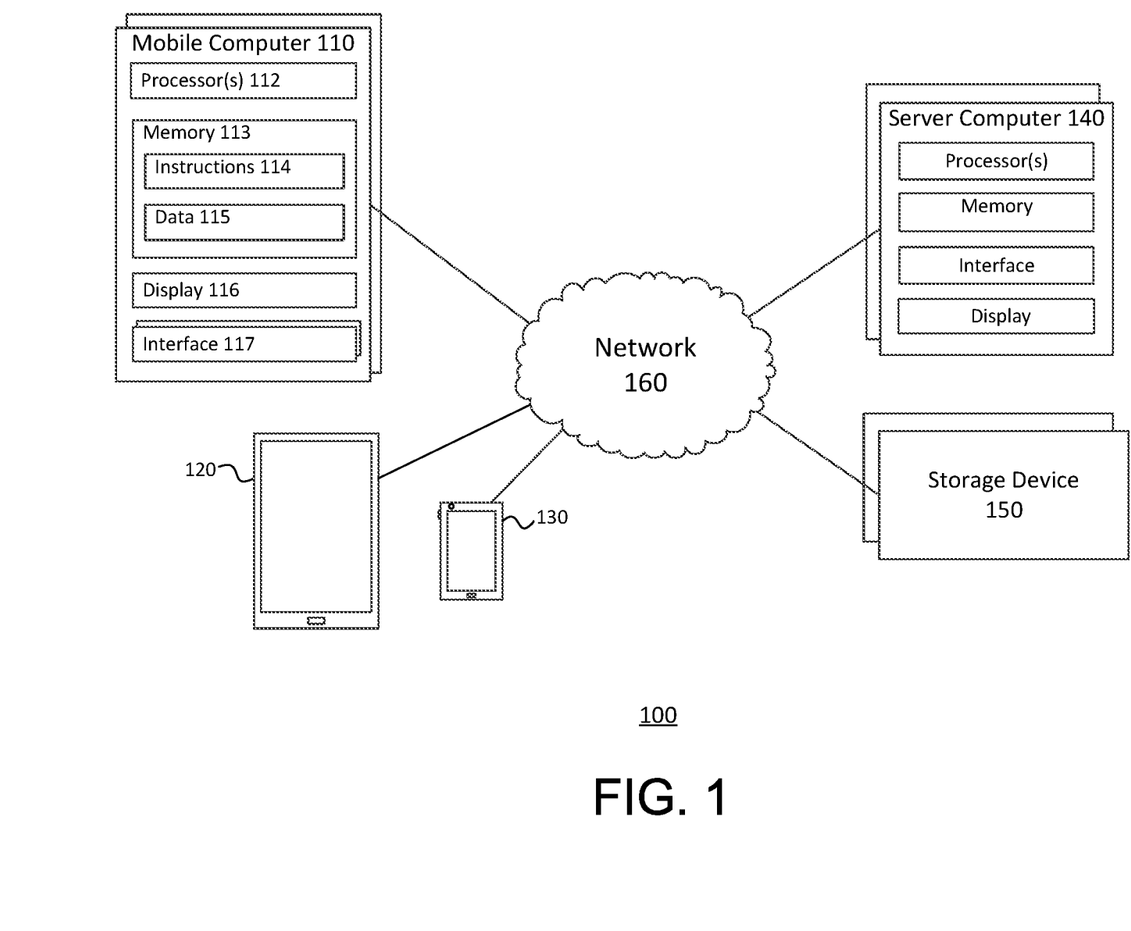
FIG. 1 illustrates an example system in accordance with one or more aspects of the disclosure.

FIG. 1 illustrates an example system 100 in accordance with one or more aspects of the disclosure. The system 100 may include one or more computing devices, e.g., mobile computer 110, tablet computer 120, smartphone 130, server computer 140, and storage device 150 connected to a network 160. For example, the mobile computer 110 may be a laptop (or any type of computer that is portable or mobile, such as an Ultrabook, smartphone, PDA, tablet computer, a wearable computing device, etc.) and includes a processor 112, memory 113, e.g., permanent or flash memory (which includes instructions 114 and data 115), a display 116, and an interface 117. Similar to the mobile computer 110, the tablet computer 120, smartphone 130, and server computer 140 may also include at least one processor, memory including instructions and data, one or more interfaces, and/or a display. The mobile computer 110 may be configured to communicate with the tablet computer 120, the smartphone 130, server computer 140, and/or the storage device 150 via the network 160. As shown in FIG. 1, the cascaded blocks associated with a particular component illustrate that more than one of those components may exist, and it may be understood that different components can be cascaded and that there may be numerous variations thereof.

The processor 112 of the mobile computer 110 instructs the various components of the mobile computer 110 to perform various tasks based on the processing of certain information, such as instruction 114 and/or data 115, stored in memory 113. For example, the processor 112 may be hardware that can be configured to perform one or more operations, e.g., adding, subtracting, multiplying, comparing, jumping from one program to another program, operating input and output, etc., and may be any standard processor, such as a central processing unit (CPU), or may be a dedicated processor, such as an application-specific integrated circuit (ASIC) or a field programmable gate array (FPGA) or an industrial process controller. Moreover, the processor 112 may have any suitable configuration or configuration of circuitry that processes information and/or instructs the components of the mobile computer 110, or performs distributed processing. While one processor block is shown in FIG. 1, it may be understood that the mobile computer 110 may also include multiple processors to individually or collectively perform tasks, as described above.

Memory 113, whether permanent or flash, may be any suitable type of hardware configured to store information accessible by the processor 112, such as instructions 114 and data 115, which can be executed, retrieved, manipulated, and/or stored by the processor 112. It may be physically contained in or coupled to the mobile computer 110. For example, memory 113 may be ROM, RAM, CD-ROM, hard drive, write-capable, read-only, etc. Moreover, the instructions 114 stored in memory 113 may include any set of executable instructions, code, or one or more algorithms, e.g., "steps" associated with software, that can be executed directly or indirectly by the processor 112. The instructions 114 may be also transferred onto memory 113 in various ways, e.g., from server computer 140 and/or storage device 150 via network 160. In addition, the data 115 stored in memory 113 may be retrieved, stored or modified by the processor 112, for example, in accordance with the instructions 114. In one aspect, the data 115 may be stored as a collection of data. For instance, although the invention is not limited by any particular data structure, the data 115 may be stored in registers, in a database as a table having multiple fields and records, such as an XML. Similar to the instructions 114, the data 115 may also be transferred onto memory 113 from various components via network 160.

The display 116 may be any suitable type of device capable of communicating data and various types of information to a user, such as visual representations of the software that can be executed by the mobile computer 110. For example, the display 116 may be a liquid-crystal display (LCD) screen, a light emitting diode (LED) screen, a plasma screen, etc. Interface 108 may be a graphical user interface (GUI) that is displayed to the user on the display 116, a keyboard, a mouse, a touch sensitive screen, a camera, a microphone, a connection or port that allows the reception of information and data, such as interactions from a user or information/data from various components via network 160. For instance, FIGS. 3 to 6 and FIGS. 8 to 10 are examples of GUIs, which will be further described below with respect to the discussion of the HLPR platform functionalities of the present invention.

The tablet computer 120 may include one or more processors (configured to execute computer instructions and/or applications), memory, one or more interfaces, a touch-screen display, sensors, microphone, camera, speakers, networking hardware (configured to connect to a network, such as network 190, via a wired or wireless connection), etc.

The smartphone 130 may be a mobile cellular phone with computing capability and network connectivity. For example, the smartphone 150 may include one or more processors, memory, one or more user interfaces, such as a QWERTY keypad, a camera, image sensors, a global positioning system (GPS), accelerator, temperature sensors, etc. Similar to the mobile computer 110 and the server computer 140, the smartphone 130 may be configured to execute computer instructions, applications, programs, and any set of instructions and data.

The server computer 140 may be rack mounted on a network equipment rack and/or located in a data center. In some examples, via the network 160, the server computer 140 may serve various requests associated with the programs executed on the mobile computer 110, the tablet computer 120, the smartphone 130, and/or the storage device 150. In further examples, the server computer 130 may be part of a plurality of server computers that support a back-end system (which may be "invisible" to users).

The storage device 150 may be configured to store a large quantity of data and may also be configured to transfer such data when requested or accessed by other components of network 160. For example, the storage device 150 may be a collection of storage components, such as ROM, RAM, hard-drives, solid-state drives, removable drives, network storage, virtual memory, multi-leveled cache, registers, CD, DVD, etc. In addition, the storage device 150 may be configured so other components of network 160, such as the mobile computer 110 and/or server computer 140, can access and provide data to other components connected to the network 160.

The network 160 may be any suitable type of network, wired or wireless, configured to facilitate the transmission of data, instructions, etc. between one or more components of the network. For example, the network 160 may be a local area network (LAN) (e.g., Ethernet or other IEEE 802.03 LAN technologies), Wi-Fi (e.g., IEEE 802.11 standards), wide area network (WAN), virtual private network (VPN), global area network (GAN), mesh network, distributed network, or any combinations thereof. In this regard, the mobile computer 110, the tablet computer 120, the smartphone 130, the server computer 140, and/or the storage device 150 may connect to and communicate with one another via the network 160.

While the mobile computer 110 may be a portable computer in the above-described examples, mobile computer 110 is not limited to just portable computers, but may be any device capable of processing data and/or instructions and transmitting and/or receiving data. Moreover, it will be understood by those skilled in the art that those components may actually include multiple processors, memories, instructions, data or displays that may or may not be stored within the same physical housing. And although the various components of FIG. 1 are connected to the network 160, it may be understood that the components may also be connected to each other, in any suitable combination.

Figure 2:
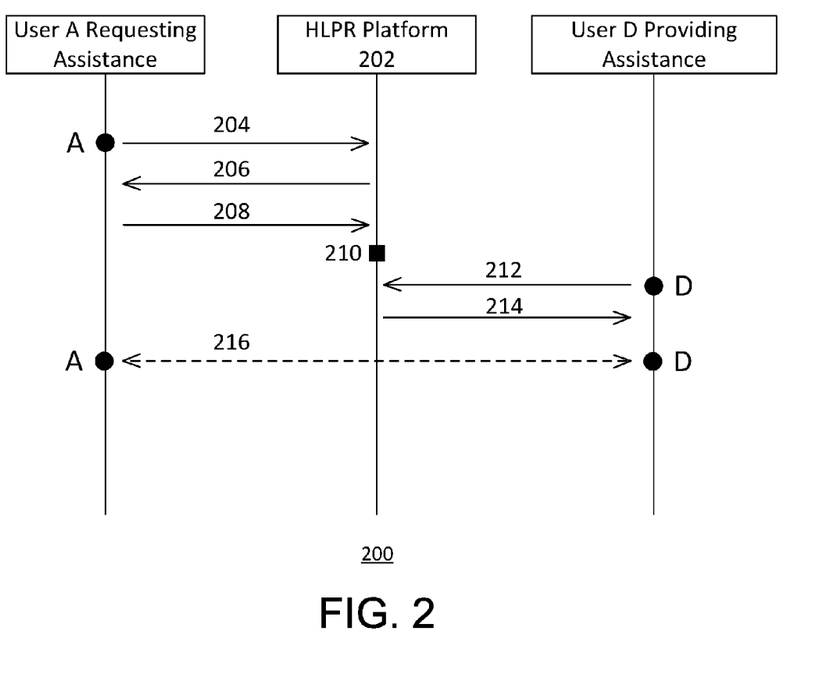
FIG. 2 illustrates a communication diagram in accordance with one or more aspects of the disclosure.

In one embodiment, direct communication may be established between a user seeking assistance and a user that will provide the assistance. FIG. 2 illustrates a communication diagram 200 in which the HLPR platform 202 establishes and facilitates the direct communication between user A (the user seeking assistance) and user D (the user providing the assistance).

As illustrated, user A via a computing device sends message 204 to the HLPR platform 202 requesting assistance from other users of the platform. The requested assistance, for instance, may be an urgent request involving a vehicular accident in which one of the involved drivers needs medical assistance. If more information about the request is required, such as the specifics of the injury, the platform 202 may send user A message 206 requesting for more information. For example, the platform 202 may request user A to specify the kind of medical assistance is needed, whether EMS, police, or rescue are needed, etc. In response, user A sends message 208 to platform 202 indicating that the requested assistance is a medical emergency involving a broken arm. The message 208 (or subsequent messages) may contain other suitable types of information, such as the geographical location (e.g., coordinates) of the user A, the time that the accident occurred, additional details about the accident, the people involved in the accident and their status, and photographs and/or videos of the accident. The information contained in message 208 (and the subsequent messages) may be stored by the platform 202 in memory, such as the memory in server computer 140.

Upon receiving the requisite information about the accident and other suitable types of information, a publication or broadcast 210 is made by the HLPR platform 202 to other users of the platform. As will be further discussed below, the publication or broadcast 210 may be a graphical representation or icon on a map interface. The appearance (e.g., color, size, pattern, etc.) of the graphical representation may correspond to the severity of the incident being published or broadcasted. In the above example, because the incident involved a car crash and further involved a victim requiring immediate medical attention, the graphical representation of the incident may be larger relative to other nearby incidents and may also be depicted in a bright color, such as red. In that regard, other users of the HLPR platform 202 near the accident site may be able to easily and conveniently distinguish the urgent request from the non-urgent requests.

Once the request from user A has been published, nearby user D may respond to the publication or broadcast 210 using the map interface. For example, user D may send a response message 212 to the platform 202 responding to the request for assistance from user A. When the HLPR platform 202 receives message 212, the platform sends user D available information about the accident. As described above, the information may be the information provided by user A in message 208 and other types of information associated with the accident, such as photographs, videos, and/or descriptions of the accident posted to the platform 202 by nearby bystanders or witnesses. In order to gain more knowledge about the accident and the injuries, user D may initiate using the platform 202 direct communication 216 with user A. If, for instance, user D was a certified physician and learned more about user A's injuries based on the direct communication 216, user D may be able to bring the appropriate medical equipment to properly treat those injuries.

Although FIG. 2 illustrates messages 204, 206, 208, 212, and 214, it may be understood by those skilled in the art that more or less messages with differing content, or in different order, may be required by the platform 202 to establish and facilitate the direct communication 216 between user A and user D.

Figure 3:
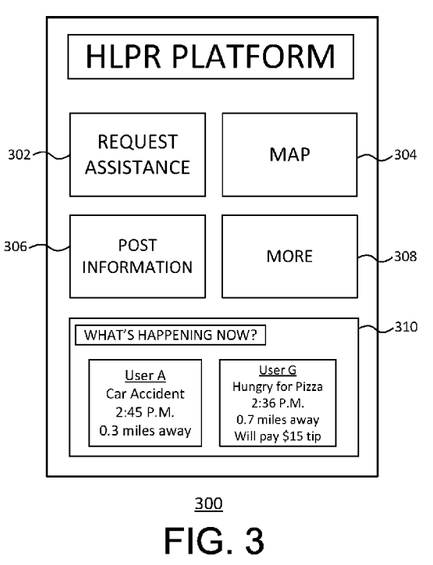
FIGS. 3 to 6 illustrate example user interfaces in accordance with one or more aspects of the disclosure.

In accordance with one or more aspects of the disclosure, easy-to-use interfaces may be displayed and presented to a user of the HLPR platform. FIG. 3 illustrates a home screen interface 300 displaying at least five different icons. The home screen interface 300 may be the first interface that the user sees when the HLPR platform is opened. As shown, for example, the home screen interface 300 may include a "request assistance" icon 302, a "map" icon 304, a "post information" icon 306, a "more" icon 308, and a "what's happening now" icon 310.

As will be further described below, the user may select (e.g., press) the "request assistance" icon 302 to request assistance from other users within, for instance, a predefined vicinity to the requesting user. When the user presses the "map" icon 304, a map interface may be displayed that graphically shows all users. The user may also post information about an incident to the HLPR platform that the user may witness using the "post information" icon 306.

The "more" icon 308 may be selected to access different features of the HLPR platform, such as access to a virtual bulletin board where information relating to various incidents may be posted, access to the user's social media accounts and information from social media feeds of others, access to news sources and outlets, etc. For instance, the user may select the "more" icon 308 to share the user's location and the request for assistance on social media so as to reach out to more people. In another instance, if the user is or is associated with an official agency, organization, or relief party, the user can select the "more" icon 308 to access and post information, such as location information and progress of assistance, on private virtual bulletin boards or chats, which are accessible only to official agencies, certain organizations, or relief parties. Using the "more" icon 308, a user may also be able to connect with certified professionals, such as paramedics, doctors, nurses, etc., who may not be able to be physically on site, in order to ask questions or seek additional information about particular injuries.

The "what's happening now" icon 310 may automatically and/or selectively display concise summaries of nearby requests or incidents without the user having to open the map interface. As shown in FIG. 3, for example, the "what's happening now" icon 310 may display two different incidents and/or requests: the first incident involving user A having been in a car accident that occurred at a certain time (e.g., 2:45 p.m. local time) at a particular distance away from the user's current location (e.g., 0.3 miles) and the second request involving a request for pizza delivery posted at a particular time (e.g., 2:36 p.m. local time) 0.7 miles away from the user with additional information that user G will pay fifteen dollars in tip upon delivery. Each of these incidents and/or requests that are displayed on the "what's happening now" icon 310 may be selectable by the user. The user will then be able to either respond to these requests, obtain more information using the map interface. If other users fulfill these requests, they may be removed from the "what's happening now" icon 310 in real-time and replaced with new ones.

Figure 4:
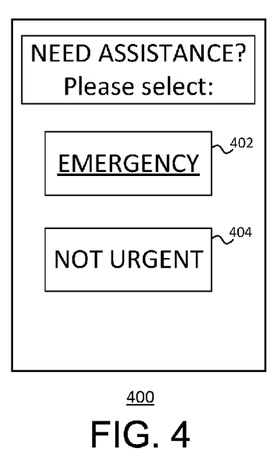

FIG. 4 illustrates an assistance screen interface 400 in accordance with one or more aspects of the disclosure. As described above with respect to FIG. 3, when the user selects or presses the "request assistance" icon 302, the assistance screen interface 400 may be displayed to the user. The user will be able to select or press either the "emergency" icon 402 or the "not urgent" icon 404. When the user presses the "emergency" icon 402, the HLPR platform may confirm with the user whether the request is actually an emergency by prompting an "are you sure this is an emergency?" confirmation box (not shown) with "yes" and "no" icons, so as to prevent false reports of emergencies or general misuse.

Figure 5:
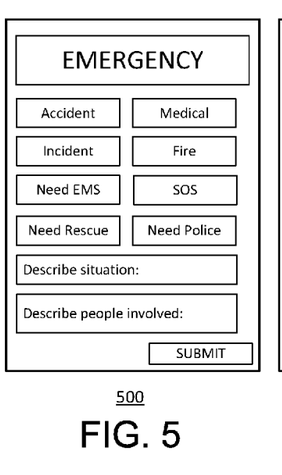

FIG. 5 illustrates an emergency screen interface 500 in accordance with one or more aspects of the disclosure. When the user selects the "emergency" icon 402 via the assistance screen interface 400 of FIG. 4, the emergency screen interface 500 may be displayed to the user. As shown, a menu of icons may be presented, each icon specifying a different type of emergency. For example, the emergency screen interface 500 may include at least an "accident" icon, a "medical" icon, an "incident" icon, a "fire" icon, a "need EMS" icon, an "SOS" icon, a "need rescue" icon, and a "need police" icon. The user may be able to select one or more of the icons in the same submission. If the user has been involved in a vehicular accident and is trapped inside his or her vehicle, then the user may be able to select at least the "accident" icon, the "medical" icon if the user has sustained any injuries, and the "need rescue" icon. Moreover, the user may optionally provide additional information about the nature of the emergency by describing the situation in the "describe situation" box and "describe the people involved" box, as shown in FIG. 5. Although not shown, the user may be able to attach photographs, videos, or any other suitable digital depiction of the incident and provide them to the HLPR platform.

Figure 6:
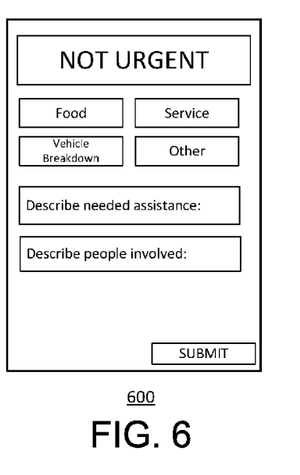

FIG. 6 illustrates a non-emergency screen interface 600 in accordance with one or more aspects of the disclosure. When the user selects the "not urgent" icon 404 via the assistance screen interface 400 of FIG. 4, the non-emergency screen interface 600 may be displayed to the user. Similar to the emergency interface 500, a menu of icons may be presented to the user, again each icon indicating a different type of non-urgent request including a "food" icon, a "service" icon, a "vehicle breakdown" icon, and an "other" icon. One or more of the aforementioned icons can be selected by the user. For instance, if the user's vehicle breaks down on a road, the user may select the "vehicle breakdown" icon as well as the "service" icon to request a tow truck to transport the vehicle to a service facility. In addition, the user may optionally provide additional information pertaining to the request via the "describe needed assistance" and "describe people involved" icons, as shown. If the user is requesting a pizza delivery, the user may select the "food" icon and describe the type of pizza desired, e.g., large pepperoni pizza from a particular establishment, etc.

Figure 7:
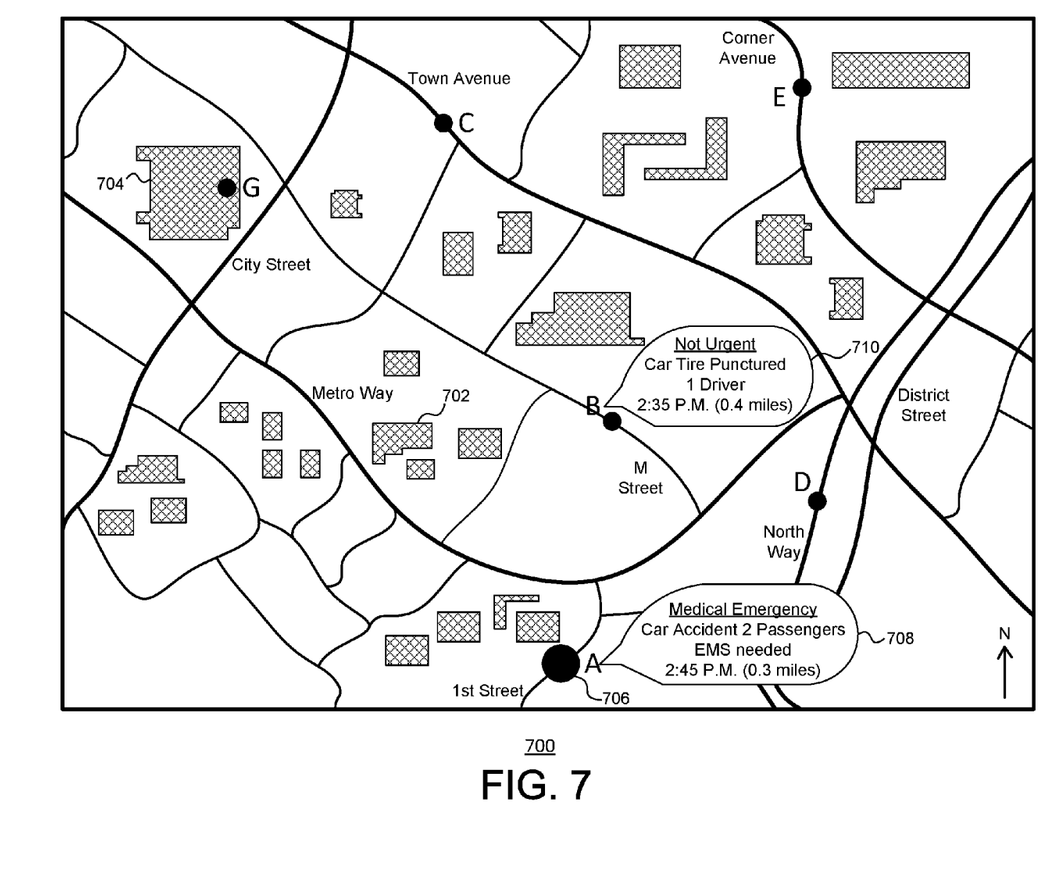
FIG. 7 illustrates an example map interface in accordance with one or more aspects of the disclosure.

FIG. 7 illustrates a map interface 700 in accordance with one or more aspects of the disclosure. When the user selects the "map" icon 304 in FIG. 3, for example, the map interface 700 may be displayed. As shown, the map interface 700 may display a birds-eye-view of a geographical area in relation to the location of the user. The location may be determined using the global positioning system of the user's computing device. In one embodiment, the displayed geographical area includes major highways and streets, including City Street, Town Avenue, Corner Avenue, District Street, North Way, and Metro Way. The map interface 700 also displays various buildings dispersed across the geographical area, such as apartment building 702 and commercial complex 704. Moreover, the various users of the HLPR platform and their respective locations may be depicted by solid dots. User A, for instance, is located on 1st Street, user B is located on M Street, user C is located on Town Avenue, user D is located on North Way, user E is located on Corner Avenue, and user G is located in the commercial complex 704.

In one example scenario, user A may be involved in a car accident. User A opens the HLPR platform on smartphone 130 (either via an installed application or a web browser) and requests emergency assistance using the emergency screen interface 500 and specifies that user A was involved in a car accident and requires EMS assistance. User A may also input additional information via the emergency screen interface 500, such as the number of passenger involved (e.g., two passengers including user A) in the accident.

The HLPR platform, using at least the map interface 700, may then graphically share, broadcast, and/or publish the information submitted by user A. In at least that regard, other users of the HLPR platform, such as user D (who may be a certified physician for instance), may be able to open the map interface 700 and know that user A requires emergency assistance. For example, as shown in FIG. 7, the solid dot 706 corresponding to the location of user A may be displayed larger relative to the other dots, which signifies that user A is involved in an emergency situation. Moreover, a bubble icon 708 may display at least some of the information submitted by user A. In FIG. 7, the bubble icon 708 may display that user A has been involved in a medical emergency—specifically a car accident—concerning two passengers (including user A) at 2:45 p.m. local time, requires EMS assistance, and that user A is 0.3 miles away. The HLPR platform may automatically and/or dynamically determine the size of the dots associated with the emergencies or non-emergencies of the users in the geographical area and also time-stamp one or more of the publications and/or broadcasts, if necessary.

Simultaneously, user D may also see on map interface 700 that user B has requested assistance with respect to a punctured tire that occurred on M Street 0.4 miles away. However, user D may observe that user B's request is not urgent and no medical assistance is required. Accordingly, the solid dot corresponding to the location of user B may be smaller than dot 706.

For a particular geographical area, such as the one being displayed on map interface 700, the HLPR platform can determine which of the requests are emergencies and graphically distinguish those requests over the non-emergency requests. In addition to the dots corresponding to the location of the user requiring emergency assistance being larger, the color of the dots may also be different (e.g., bright red), or the shape of the dot itself may be different (instead of a circular dot, it may be a triangular dot). Moreover, the location of an official agency, an organization, or a relief party may be displayed on the map interface 700 and the dot representing that location may also be distinct to show the user that the dot is associated with the agency, organization, or relief party, e.g., the dot may be a different color, size, shape, etc. The user can select the dot and the map interface 700 can subsequently display the name, location, and other helpful information associated with the agency, organization, or relief party. In at least that regard, other users, such as user D, who are able to provide assistance, can easily, conveniently, and quickly determine which of the users in the geographical area user D should tend to first. The HLPR platform may constantly analyze and determine the status of all the users in the geographical area and prioritize their needs.

While the map interface 700 shows bubble icon 708 and 710 as being a certain size, it may be understood that the size of the bubble may increase or decrease with the amount of information being displayed in the bubble icon. Moreover, similar to the above-described dots indicating the locations of the users on map interface 700, the color of the bubble icons may change depending on the subject of the information being provided (e.g., red for health related information, blue for friend related information, etc.). In addition, it may also be understood that when there are more than one event or incident in a particular geographical area, similar information or posts may be grouped together into one bubble icon.

Figure 8:
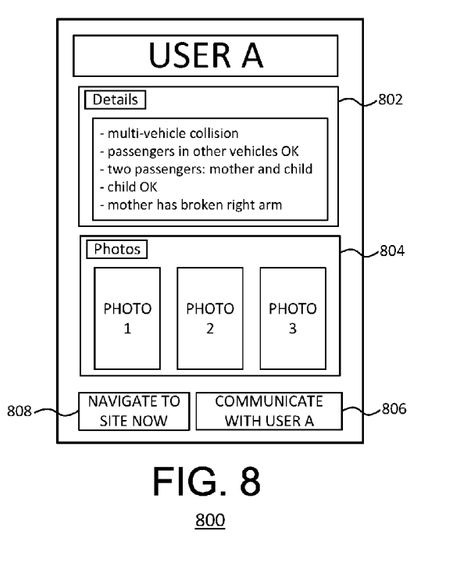
FIGS. 8 to 10 illustrate example user interfaces in accordance with one or more aspects of the disclosure.

In the example illustrated in FIG. 7, user D may choose to first render aid to user A. User D may touch, select, or press the bubble icon 708 to see if user A has provided more information about the car accident, and when user D determines that he or she is capable of providing the requisite assistance, user D may be able to establish direct communication with user A. Additionally, a different user of the HLPR platform may be able to view the same map interface 700 and observe, track, and/or monitor the assistance being provided by User D to user A in real-time. The map interface 700 may also have a search function that can allow users of the HLPR platform to search for various requests in real-time or requests that have already been addressed and the users who were involved in responding to those requests. FIG. 8 is an example of the interface that is displayed to user D when user D touches, selects, or presses the bubble icon 708.

FIG. 8 illustrates a "user A" information screen interface 800 in accordance with one or more aspects of the disclosure. As described above, when user D touches or selects the bubble icon 708, the "user A" information screen interface 800 may be displayed to user D. As shown in FIG. 8, a "details" box 802 may include various details and descriptions about the incident that user A has been involved in. The details provided to the HLPR platform may be provided directly by user A, or other users of the HLPR platform who may have been witnesses or bystanders of the incident. For example, the "details" box 802 describes the incident as a multi-vehicle collision, where the two passengers involved is a mother (user A) and a child. The child has not suffered any injuries, but user A has broken her arm. The details further specify that the passengers in the other vehicles have not sustained any injuries.

The "user A" information screen interface 800 may also display photos, images, etc. that are related to the accident in a "photos" box 804. Photo 1, for example, may be an image of the damaged vehicles. Photo 2 may show user A's broken arm so that user D, who is a certified physician, may know what kinds of medical equipment to bring in order to treat user A. Photo 3 may be an image of a particular landmark near the location of the accident in order to allow other users to easily find the location of the incident. Similar to the details in the "details" box 802, the photos may be provided to the HLPR platform directly from user A, or from other others who are witnesses or bystanders to the accident. While FIG. 8 shows photos 1, 2, and 3 in "photos" box 804, it may be understood that moving images or videos may also be captured, uploaded, and displayed.

Moreover, the "user A" information screen interface 800 may include a "communicate with user A" icon 806 that allows user D to establish direct communication with user A, if necessary. As will be further discussed with respect to FIG. 9, if user D, for example, requires more information from user A in order to better treat her broken arm or other injuries, then user D may want to directly communicate with user A to ask her for more information. Alternatively, user D may want to message user A message to simply reassure her that user D is on the way to render assistance. Moreover, to expedite the assistance process, user D can also press a "navigate to site now" icon 808 to obtain turn-by-turn directions to the actual geographical location of the incident and/or the actual location of user A.

Figure 9:
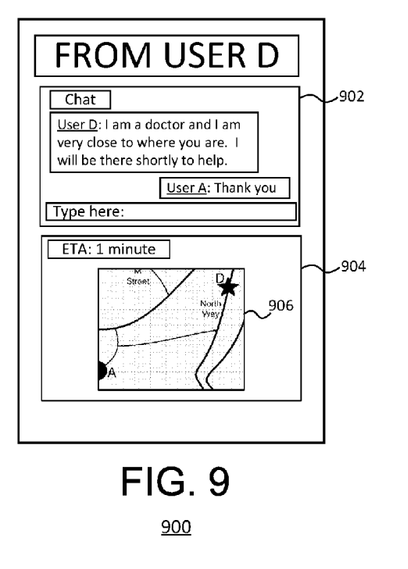

FIG. 9 illustrates a "from user D" screen interface 900 in accordance with one more aspects of the disclosure. When user D establishes communication with user A, or notifies the HLPR platform that user D will render assistance to user A, the "from user D" screen interface 900 is displayed to user A. A chat-box 902 may be displayed with a chat message from user D to user A that reads "I am a doctor and I am very close to where you are. I will be there shortly to help." Using the chat-box 902, user A may reply to user D's message with a "thank you." As described above, user D may be able to inquire more about the status of user A's injury and other pertinent information using the chat-box 902. Moreover, the "from user D" screen interface 900 may display via an "ETA" box 904 the current location of user D by way of a map interface 906 and user D's estimated time of arrival. In at least this regard, user A can be reassured that user D is on the way to render assistance.

Figure 10:
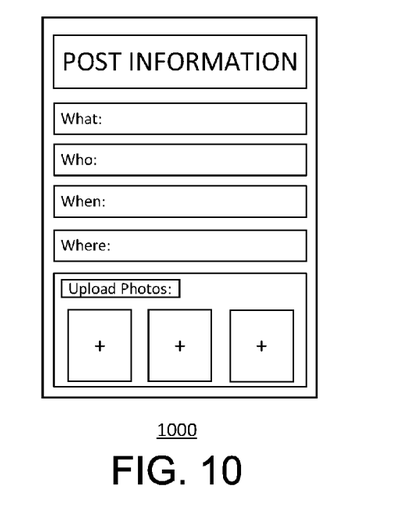

FIG. 10 illustrates a "post information" screen interface 1000 in accordance with one or more aspects of the disclosure. When a user presses or selects the "post information" icon 306 shown in FIG. 3, for instance, the "post information" screen interface 1000 may be displayed. Using at least this feature, bystanders or witnesses of an incident may be able to provide information to the HLPR platform. The "post information" screen interface 1000 may prompt the user to describe the what, who, when, and where of the incident, and also provide the option of uploading photographs or images related to the incident. Once the information has been received, the HLPR platform may be able to automatically associate the posted information with (1) information related to an already existing request for assistance or a particular incident or (2) create a new request for assistance, or event, or incident on the map interface, for example, if the posted information cannot be associated with something that is already existing.

A new event or incident may be created by the HLPR platform based on posted information from a bystander or witness when the user(s) actually involved cannot do so. In the above-examples, if user A was unconscious and was not physically able to use the HLPR platform, a bystander would be able to post details about the accident and the condition of user A onto the HLPR platform, where user D would then be able to directly communicate with the bystander using the HLPR platform if user D requires more information about the incident or the status of user A.

It may be understood that the various screen interfaces and icons illustrated in FIGS. 3 to 10 may be operated using an application and/or a web browser. In other words, the HLPR platform does not have to be downloaded by the user prior to use. Moreover, it may be understood that the various icons associated with the screen interfaces shown in FIGS. 3 to 10 may be arranged in many different ways and in any suitable manner.

Moreover, in order to prevent inappropriate posts or requests, the users of the HLPR platform, as a community, may self-regulate. For example, users may object certain requests or posts. The regulation may also be based on a raking or rating system. With respect to graphic images or photos, users may be able to warn others of graphic content or be able to pixilate or blur portions of the images. In addition to preventing inappropriate posts or requests, a community of users may be able to verify the accuracy of the photographs or videos. For instance, users may be able to vote "up" or "down" whether a photograph or a video accurately depicts an incident, or alternatively assign the photograph or video a score to indicate its accuracy. To that end, if there are a total of 25 pictures related to a house fire, only the photographs that were voted "up" by people who were physically near the fire can be posted to the HLPR platform. This can provide, for instance, one way to ensure that the information posted to the platform is accurate. Moreover, in order for users to identify themselves as certified professionals, those users may be required to submit documentation proving certification. The platform can designate the certified users with special symbols or any other suitable graphical representation.

It may also be understood that the platform can be used in conjunction with conventional ways of requesting assistance or help. In the above-described examples, for instance, user A may be able to request assistance on the platform before or after she has called 911 or 112. In at least that regard, it is possible for operators of 911 or 112 to also use the HLPR platform and acquire accurate location information of the user requesting assistance. If, for example, the operator cannot locate the user using conventional 911 or 112 mapping tools, then the operator may ask the user to locate him or herself on the HLPR platform.

Additionally, while the examples in FIGS. 3 to 10 described an individual user responding to a request, it may be understood that users responding to requests via the platform may include not only individual users, but also commercial entities, e.g., pizza restaurants that are able to satisfy user G's request, as shown in FIG. 3 and FIG. 7.

The present invention is advantageous in various ways. As described above, a user is not required to download the platform beforehand in order to use it. Users are also not required to subscribe to the platform. Moreover, the use of the platform may be as ubiquitous as calling 911, 112, or shouting for help. The platform also does not limit the user to a predefined network of friends and the user is able to share information about an incident and the corresponding location of the incident with any nearby user. To at least that end, the platform facilitates communication between users who do not know each other or not previously connected to each other via social media. Moreover, the platform allows a requesting user and a responding user to directly communicate with each other and also allows the requesting user to know the ETA status of the responding user. The platform may empower the community of users to help each other and even allows bystanders and witnesses to contribute by posting information to the platform, thus employing the "collective intelligence" of a particular community.

In addition to the above-described examples, embodiments, and aspects of the HLPR platform, the present disclosure may have other numerous applications, such as alert systems for child abduction, missing children, and lost pets, review of businesses, integration into GPS systems and other map interface platforms, incorporation of news feeds, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

What is claimed is:

1. A method for location-based sharing of information and location-based response to the shared information, the method comprising:
   receiving, by a computing device, a first message from a first user computing device, the first message including a request for assistance;
   determining, by the computing device, a first geographical location corresponding to the first user computing device;
   publishing, by the computing device, the first geographical location corresponding to the first user computing device on a map interface;
   receiving, by the computing device, a second message from a second user computing device, the second message including a response to the request for assistance;
   determining, by the computing device, whether the response indicates a request to establish direct communication with the first user computing device, wherein the response is input by the second user via the map interface; and
   based on the determination, establishing, by the computing device, the direct communication between the first user computing device and the second user computing device, and
   wherein the map interface is readily available to both the first and second users via the respective first and second user computing devices without requiring the first and second users to: (i) sign-in, subscribe, or login and/or (ii) share a predefined relationship or be part of a social network.

2. The method of claim 1, further comprising receiving, by the computing device, information associated with the request for assistance from the first user computing device.

3. The method of claim 2, wherein the information includes one or more of: (i) an incident related to the request for assistance, (ii) people involved in the incident, (iii) indication that the request for assistance is an emergency, and (iv) indication that the request for assistance is not an emergency.

4. The method of claim 1, further comprising providing, by the computing device, on the map interface a time of the publication of the first location corresponding to the first user computing device on a map interface.

5. The method of claim 1, further comprising:
   determining, by the computing device, a second geographical location corresponding to the second user computing device; and
   determining, by the computing device, a distance between the first geographical location and the second geographical location.

6. The method of claim 5, further comprising providing, by the computing device, on the map interface the distance between the first geographical location and the second geographical location.

7. The method of claim 1, further comprising determining, by the computing device, whether the request for assistance is an emergency.

8. The method of claim 7, further comprising providing, by the computing device, on the map interface a special indicator indicating the emergency at the first geographical location corresponding to the first user computing device, wherein the special indicator is different from an indicator associated with a non-urgent request for assistance.

9. The method of claim 1, further comprising:
   determining, by the computing device, a second geographical location corresponding to the second user computing device; and
   providing, by the computing device, to the second user computing device turn-by-turn directions from the second geographical location to the first geographical location.

10. The method according to claim 9, further comprising providing, by the computing device, to the first user computing device an estimated time of arrival (ETA) of the second user computing device to the first geographical location.

11. The method according to claim 2, further comprising providing, by the computing device, the information associated with the request for assistance to the second user computing device.

12. The method according to claim 3, further comprising receiving, by the computing device, one or more of: (i) a first image and (ii) a first video associated with the incident from the first user computing device.

13. The method according to claim 12, further comprising receiving, by the computing device, one or more of: (i) a second image and (ii) a second video associated with the incident from a third user computing device.

14. The method according to claim 13, further comprising:
   associating, by the computing device, the one or more of the first image and the first video from the first user computing device and the one or more of the second image and the second video from the third user computing device with the incident as a set of visual information of the incident; and
   providing, by the computing device, the set of the visual information of the incident to the second user computing device.

15. The method of claim 8, further comprising determining, by the computing device, a priority of the emergency relative to other previously received assistance requests, wherein one or more of: (i) a shape, (ii) a size, and (iii) a color of the special indicator is based on the determined priority of the emergency.

16. The method of claim 1, wherein the direct communication between the first computing device and the second computing device is performed via a messaging interface.

17. The method of claim 1, wherein the map interface graphically depicts a predefined geographical area, the first user computing device and the user second computing device being located within the predefined geographical area.

18. A system for location-based sharing of information and location-based response to the shared information, the system comprising:
   memory; and
   at least one processor for executing stored instructions to:
      receive a first message from a first user computing device, the first message including a request for assistance,
      determine a first geographical location corresponding to the first user computing device,
      publish the first geographical location corresponding to the first user computing device on a map interface,
      receive a second message from a second user computing device, the second message including a response to the request for assistance,
      determine whether the response indicates a request to establish communication with the first user computing device, wherein the response is input by the second user via the map interface, and based on the determination, establish direct communication between the first user computing device and the second user computing device, and wherein the map interface is readily available to both the first and second users via the respective first and second user computing devices without requiring the first and second users to: (i) sign-in, subscribe, or login and/or (ii) share a predefined relationship or be part of a social network.

19. A non-transitory computer readable medium storing instructions, the stored instructions when executed by at least one processor performs a method for location-based sharing of information and location-based response to the shared information, the method comprising:

receiving, by a computing device, a first message from a first user computing device, the first message including a request for assistance;

determining a first geographical location corresponding to the first user computing device;

publishing the first geographical location corresponding to the first user computing device on a map interface;

receiving a second message from a second user computing device, the second message including a response to the request for assistance;

determining whether the response indicates a request to establish communication with the first user computing device, wherein the response is input by the second user via the map interface; and based on the determination, establishing direct communication between the first user computing device and the second user computing device, and wherein the map interface is readily available to both the first and second users via the respective first and second user computing devices without requiring the first and second users to: (i) sign-in, subscribe, or login and/or (ii) share a predefined relationship or be part of a social network.

* * * * *